United States Patent
Arndt

(10) Patent No.: US 6,654,906 B1
(45) Date of Patent: Nov. 25, 2003

(54) RECOVERY FROM INSTRUCTION FETCH ERRORS IN HYPERVISOR CODE

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/589,660

(22) Filed: Jun. 8, 2000

(51) Int. Cl.[7] .......................... H02H 3/05; G06F 17/00; G06F 15/00; G06F 7/38
(52) U.S. Cl. ............................. 714/11; 714/20; 709/1; 712/13; 712/228
(58) Field of Search ............................. 714/6–8, 11–13, 714/16–17, 25, 48; 709/1; 712/13, 228

(56) References Cited

U.S. PATENT DOCUMENTS

| | | | | |
|---|---|---|---|---|
| 3,898,621 A | * | 8/1975 | Zelinski et al. ................ | 714/11 |
| 4,370,705 A | * | 1/1983 | Imazeki et al. ................ | 700/79 |
| 5,345,590 A | * | 9/1994 | Ault et al. ..................... | 709/1 |
| 5,659,756 A | * | 8/1997 | Hefferon et al. ............. | 710/200 |
| 5,872,907 A | * | 2/1999 | Griess et al. .................. | 714/17 |
| 6,085,253 A | * | 7/2000 | Blackwell et al. ........... | 709/235 |
| 6,199,179 B1 | * | 3/2001 | Kauffman et al. ............ | 714/26 |
| 6,304,980 B1 | * | 10/2001 | Beardsley et al. ............ | 714/6 |

* cited by examiner

*Primary Examiner*—Scott Baderman
*Assistant Examiner*—Emerson Puente
(74) *Attorney, Agent, or Firm*—Duke W. Yee; Mark E. McBurney; Lisa L. B. Yociss

(57) ABSTRACT

A method, system, and apparatus for recovering form an instruction fetch error is provided. In one embodiment, a data processing system maintains a primary copy and an alternate copy of a set of instructions for a software component. The instructions for performing the processes of the software component are fetched from the primary copy for execution by a processor. A pair of pointers is maintained in each copy identifying the beginning of each copy. Responsive to a determination that an instruction fetch error has been received, a corresponding current instruction in the alternate copy is determined and the software component is restarted by fetching and executing instructions from the alternate copy starting with the corresponding current instruction. The corresponding current instruction is determined by subtracting the beginning address of the copy with the error from the address of the current instruction, then adding the beginning address of the alternate copy.

25 Claims, 5 Drawing Sheets

RECOVERY FROM INSTRUCTION FETCH ERRORS IN HYPERVISOR CODE

CROSS REFERENCE TO RELATED APPLICATIONS

The present application is related to co-pending U.S. patent application Ser. No. 0/958,797 entitled "RECOVERY FROM DATA FETCH ERRORS IN HYPERVISOR CODE" filed Jun. 8, 2000. The content of the above-mentioned commonly assigned, co-pending U. S. Patent application is hereby incorporated herein by reference for all purposes.

BACKGROUND OF THE INVENTION

1. Technical Field:

The present invention relates generally to the field of computer architecture and, more specifically, to methods and systems for managing resources among multiple operating system images within a logically partitioned data processing system.

2. Description of Related Art:

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

One means for separating the partitions is managed by a firmware component, such as, for example, the hypervisor within an RS/6000 platform, a product of International Business Machines Corporation of Armonk, N.Y. Hardware errors that are fatal to this firmware component become fatal for the entire platform, thus, bringing down the entire system. One major hardware error that may affect the hypervisor is an instruction fetch unrecoverable memory error (IfetchUE). The Risc system 6000 memory, within the RS/6000, is single bit error correction code protected, that is, hardware is able to correct any single bit error by special redundancy codes. However, currently, multi-bit errors cannot be corrected, but may only be detected. Multi-bit errors, while rare, occur due to a variety of conditions. Therefore, a method, system, and apparatus for recovering and isolating errors affecting the hypervisor is desirable.

SUMMARY OF THE INVENTION

The present invention provides a method, system, and apparatus for recovering from an instruction fetch error. In one embodiment, a data processing system maintains a primary copy and an alternate copy of a set of instructions for a software component. The instructions for performing the processes of the software component are fetched from the primary copy for execution by a processor. A pair of pointers is maintained in each copy identifying the beginning of each copy. Responsive to a determination that an instruction fetch error has been received, a corresponding current instruction in the alternate copy is determined and the software component is restarted by fetching and executing instructions from the alternate copy starting with the corresponding current instruction. The corresponding current instruction is determined by subtracting the beginning address of the copy with the error from the address of the current instruction, then adding the beginning address of the alternate copy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
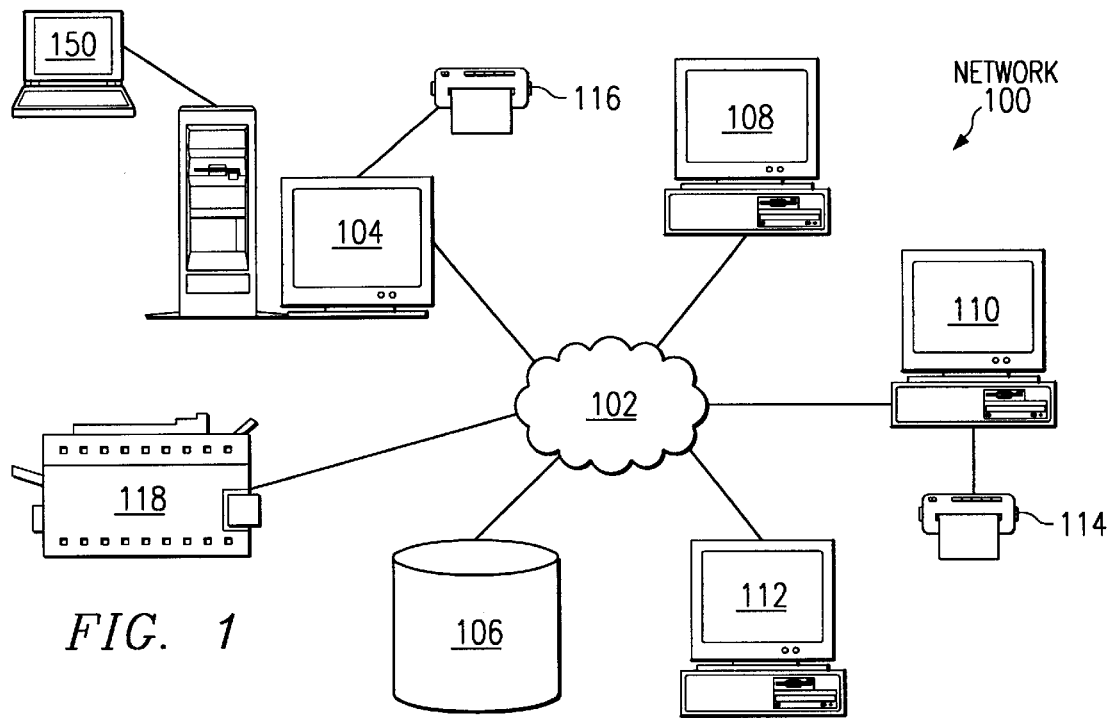
FIG. 1 depicts a pictorial representation of a distributed data processing system in which the present invention may be implemented.

With reference now to the figures, and in particular with reference to FIG. 1, a pictorial representation of distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
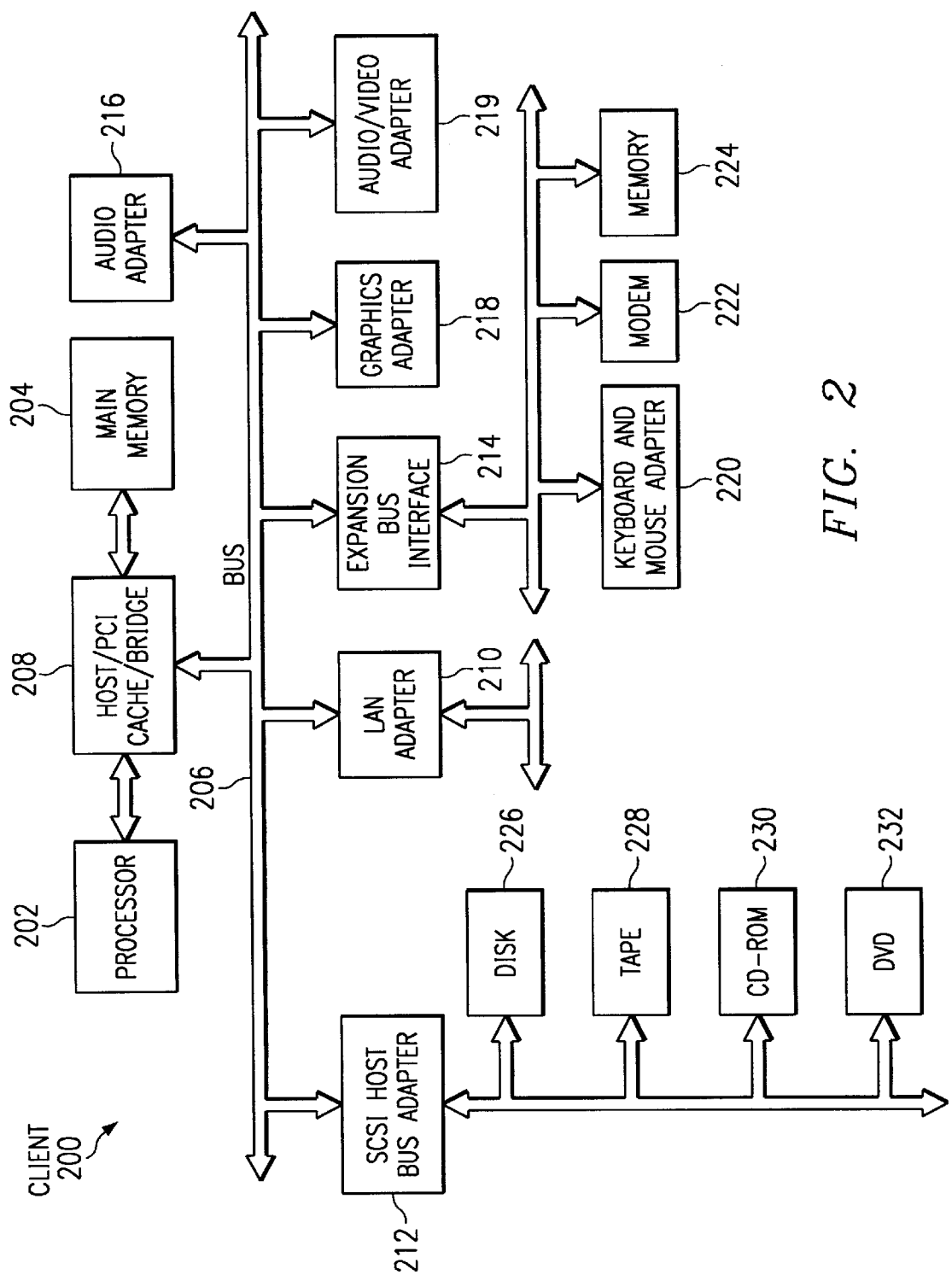
FIG. 2, a block diagram of a data processing system in accordance with the present invention is illustrated.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
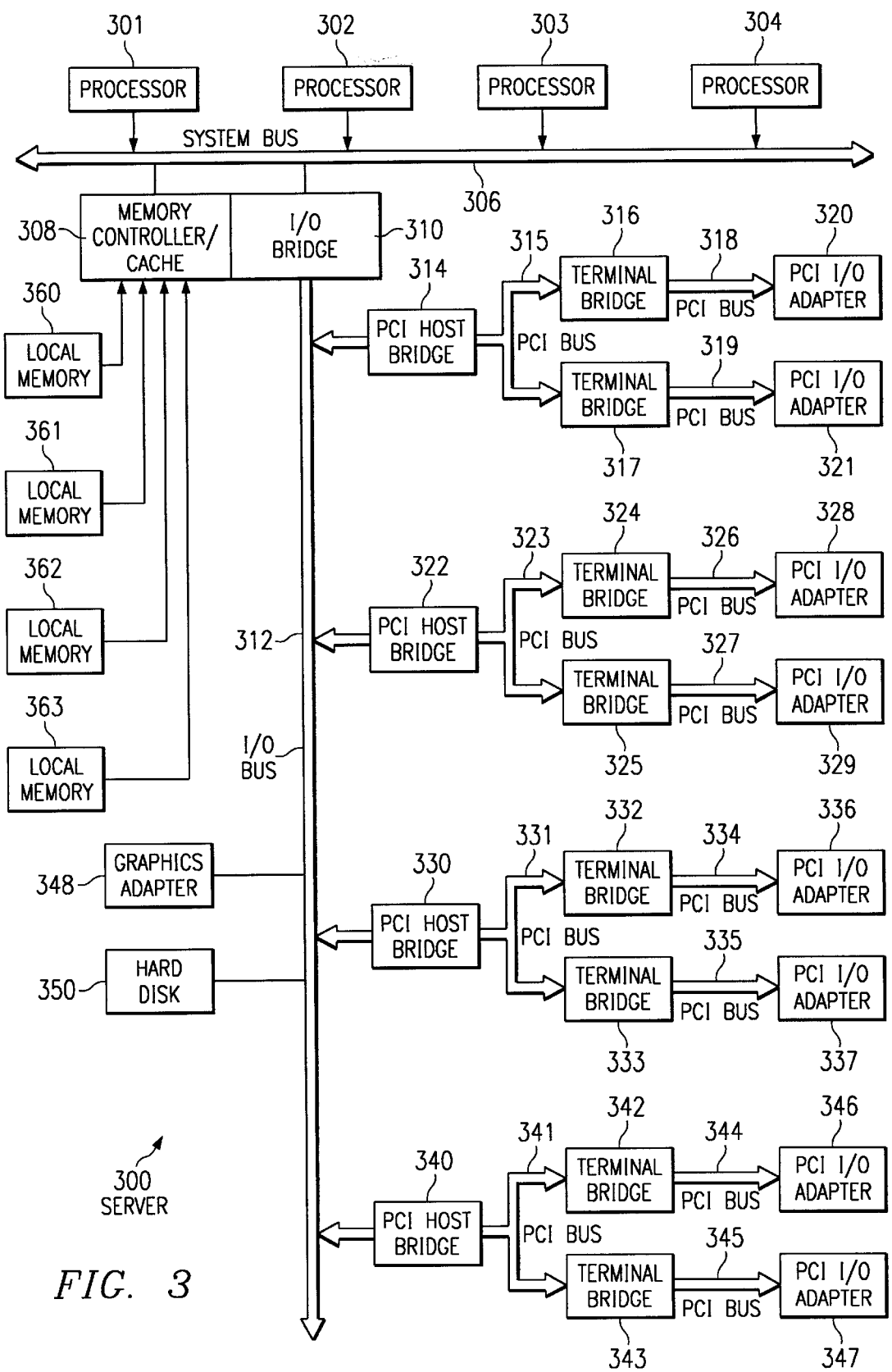
FIG. 3 depicts a block diagram of a data processing system, which may be implemented as a logically partitioned server, in accordance with the present invention.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM RS/6000, a product of International Business Machines Corporation in Armonk, N.Y. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing with data processing system 300 is assigned to a different logicical pattern. Thus, each operating system executing within data processing system 300 may access only those I/O units that are within its logical partition. Thus, for example, one instance of the Advanced Interactive Executive (AIX) operating system may be execting within partition P1, a second instance (image) of the AIX operating system may be execting within partition P2, and a Windows™ operating system may be operating within logical partition P3. Windows 2000 is a product and trademark of Microsoft Corporation of Redmond, Wash.

Peripheral component interconnect (PCI) Host bridge 314 connected to I/O bus 312 provides an interface to PCI local bus 315. A number of Terminal Bridges 316–317 may be connected to PCI bus 315. Typical PCI bus implementations will support four Terminal Bridges for providing expansion slots or add-in connectors. Each of Terminal Bridges 316–317 is connected to a PCI/I/O Adapter 320–321 through a PCI Bus 318–319. Each I/O Adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343, which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
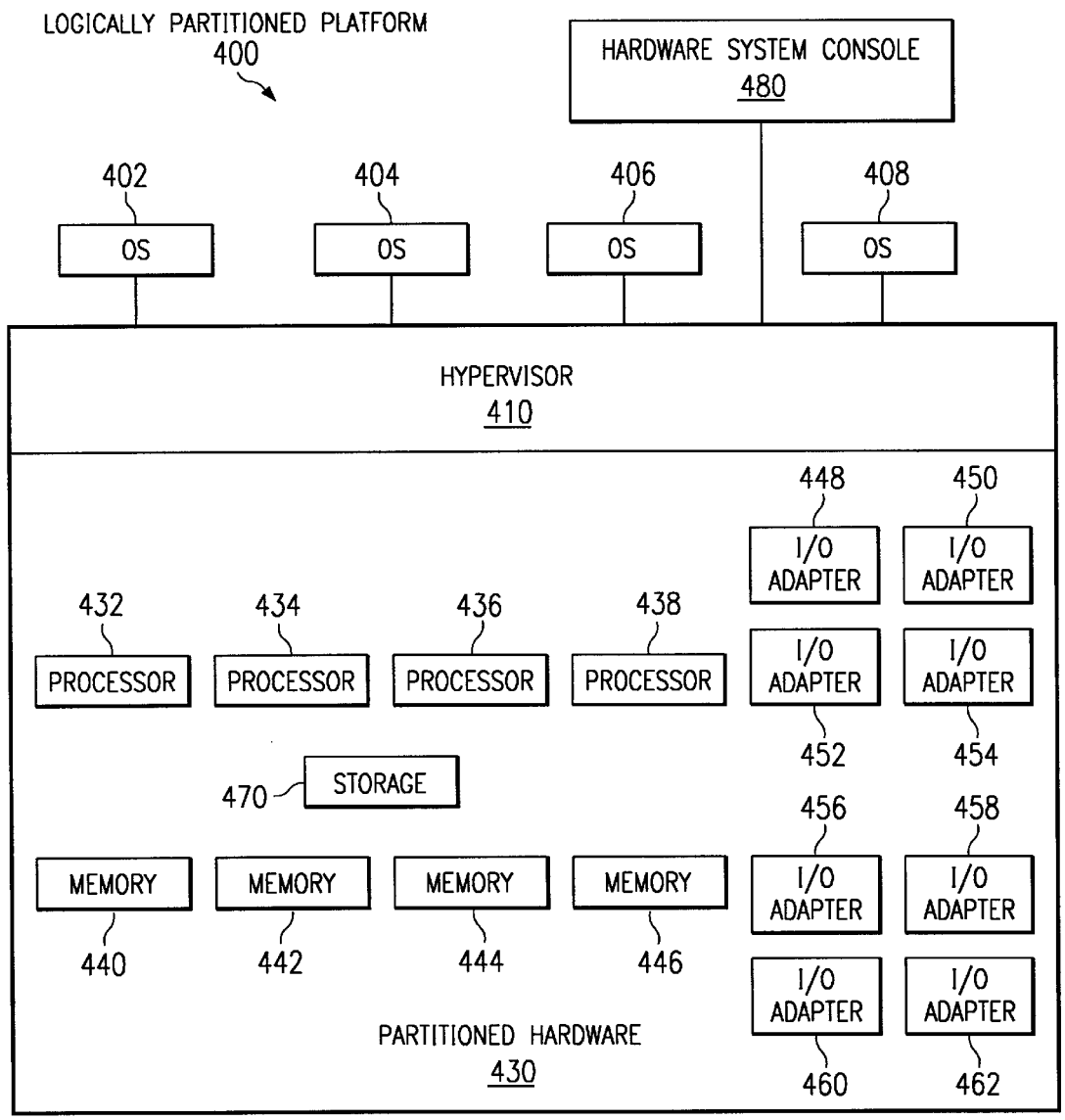
FIG. 4 depicts a block diagram of a logically partitioned platform in which the present invention may be implemented.

With reference now to FIG. 4, a block diagram of an exemplary logically partitioned platform is depicted in which the present invention may be implemented. The hardware in logically partitioned platform 500 may be implemented as, for example, server 300 in FIG. 3. Logically partitioned platform 400 includes partitioned hardware 430, hypervisor 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality or system memory units 440–446, a plurality of input/output (I/O) adapters 448–462, and a storage unit 470. Each of the processors 432–438, memory units 440–446, and I/O adapters 448–462 may be assigned to one of multiple partitions within logically partitioned platform 400, each of which corresponds to one of operating systems 402–408.

Hypervisor 410, implemented as firmware, performs a number of functions and services for operating system images 402–408 to create and enforce the partitioning of logically partitioned platform 400. Firmware is "hard software" stored in a memory chip that holds its content. without electrical power, such as, for example, read-only memory (ROM), programmable ROM (PROM), erasable programmable ROM (EPROM), electrically erasable programmable ROM (EEPROM), and non-volatile random access memory (non-volatile RAM).

Hypervisor 410 provides a secure direct memory access (DMA) window, per IOA, such as, for example, IOA 328 in FIG. 3, on a shared I/O bus, such as, for example, I/O bus 312 in FIG. 3, into the memory resources allocated to its associated OS image, such as, for example, OS image 402 in FIG. 4. The secure DMA window provides access from an IOA to memory which is allocated to the same partition as the IOA, while preventing the IOA from getting access to the memory allocated to a different partition.

In one embodiment, as implemented within an RS/6000 Platform Architecture, the hypervisor makes use of two existing hardware mechanisms. These hardware mechanisms are called the translation control entry (TCE) facility and the DMA range register facility Bridge. In one embodiment, the TCE facility is implemented in the PCI Host Bridge, such as PCI Host Bridges 314, 322, 330, and 340 in FIG. 3, and the range register facility is implemented in the Terminal Bridge, such as Terminal Bridges 316–317, 324–325, 332–333, and 342–343.

The TCE facility (not shown) is a facility for the I/O which is analogous to the virtual memory address translation facility provided by most processors today. That is, the TCE facility provides a mechanism to translate a contiguous address space on the I/O bus to a different and possibly non-contiguous address space in memory. It does this in a manner similar to the processor's translation mechanism, and thus breaks the address space of the memory and the address space of the I/O bus into small chunks, called pages. For IBM PowerPC processor based platforms, this size is generally 4 Kbytes per page. Associated with each page is a translation and control entry. This translation and control entry is called a TCE for this I/O translation mechanism, and is sometimes called the Page Table Entry for the corresponding processor virtual translation mechanism. These translation entries are in different tables for the processor and I/O.

When an I/O operation starts on the bus, the TCE facility accesses the entry for that page in the TCE table, and uses the data in that entry as the most significant bits of the address to access memory, with the least significant bits being taken from the I/O address on the bus. The number of bits used from the bus is dependent on the size of the page, and is the number of bits necessary to address to the byte level within the page (e.g., for the 4 Kbyte page size example, the number of bits taken from the bus would be 12, as that is the number of bits required to address to the byte level within the 4 Kbyte page). Thus, the TCE provides bits to determine which page in memory is addressed, and the address bits taken from the I/O bus determines the address within the page.

The bus address ranges that the IOAs are allowed to place onto the I/O bus are limited by the range register facility. The range register facility contains a number of registers that hold addresses that are compared to what the IOA is trying to access. If the comparison shows that the IOA is trying to access outside of the range of addresses that were programmed into the range registers by the firmware, then the bridge will not respond to the IOA, effectively blocking the IOA from accessing addresses that it is not permitted to access. In this embodiment, these two hardware mechanisms are placed under the control of the hypervisor.

When platform 400 is initialized, a disjoint range I/O bus DMA addresses is assigned to each of IOAs 448–462 for the exclusive use of the respective one of IOAs 448–462 by hypervisor 410. Hypervisor 410 then configures the Terminal Bridge range register (not shown) facility to enforce this exclusive use. Hypervisor 410 then communicates this allocation to the owning one of OS images 402–408. Hypervisor also initializes all entries in a particular IOA's associated section of the TCE table to point to a reserved page per image that is owned by the OS image that is allocated that IOA, such that unauthorized accesses to memory by an IOA will not create an error that could affect one of the other OS images 402–408.

When an owning one of OS images 402–408 requests to map some of its memory for a DMA operation, it makes a call to the hypervisor 410 including parameters indicating the IOA, the memory address range, and the associated I/O bus DMA address range to be mapped. The hypervisor 410 checks that the IOA and the memory address range are allocated to the owning one of OS images 402–408. The hypervisor 410 also checks that the I/O bus DMA range is within the range allocated to the IOA. If these checks are passed, the hypervisor 410 performs the requested TCE mapping. If these checks are not passed, he hypervisor rejects the request.

Hypervisor 410 also may provide the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 410 encapsulates the data from the various OS images onto a message stream that is transferred to a computer 480, known as a hardware system console.

Hardware system console 480 is connected directly to logically partitioned platform 400, as illustrated in FIG. 4, or may be connected to logically partitioned platform through a network, such as, for example, network 102 in FIG. 1. Hardware system console 480 may be, for example, a desktop or laptop computer, and may be implemented as data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the hypervisor 410 emulated port device driver associated with the then active window on the hardware system console 480. Hypervisor 410 may also perform other functions and services.

In order to prevent instruction fetch errors in hypervisor 410 from affecting OS images 402–408 and the rest of platform 400, two copies of the hypervisor 410 instructions are loaded into the memory of platform 400. A hypervisor 410 instruction fetch error occurs when one of the processors 432–438 is executing hypervisor 410 instructions, and after fetching the next instruction from one of memories 440–446 containing the hypervisor 410 instructions, detects that there is an error in the instruction. For example, the error could be the result of the instruction having been stored in a bad memory location, such that the instruction has become corrupted. Such an error in the instruction results in a machine check interrupt and the processor, an occurrence of such an interrupt, is unable to determine what instruction it should execute next. In the prior art, such an occurrence would result in either a need to reboot the entire system, thus interfering with the continuous operation of OS images 402–408, or extra redundancy bits for the entire system memory plus more complex encoding and decoding logic were utilized to recover from the error. Allowing for the necessity of rebooting the entire system could result in the loss of data for applications executing in one of OS images 402–408, which is unacceptable and should be avoided if at all possible. Utilizing the extra redundancy bits along with more complex encoding and decoding logic impairs the speed and performance of platform 400.

Those of ordinary skill in the art will appreciate that the hardware and software depicted in FIG. 4 may vary. For example, more or fewer processors and/or more or fewer operating system images may be used than those depicted in FIG. 4. The depicted example is not meant to imply architectural limitations with respect to the present invention.

Figure 5:
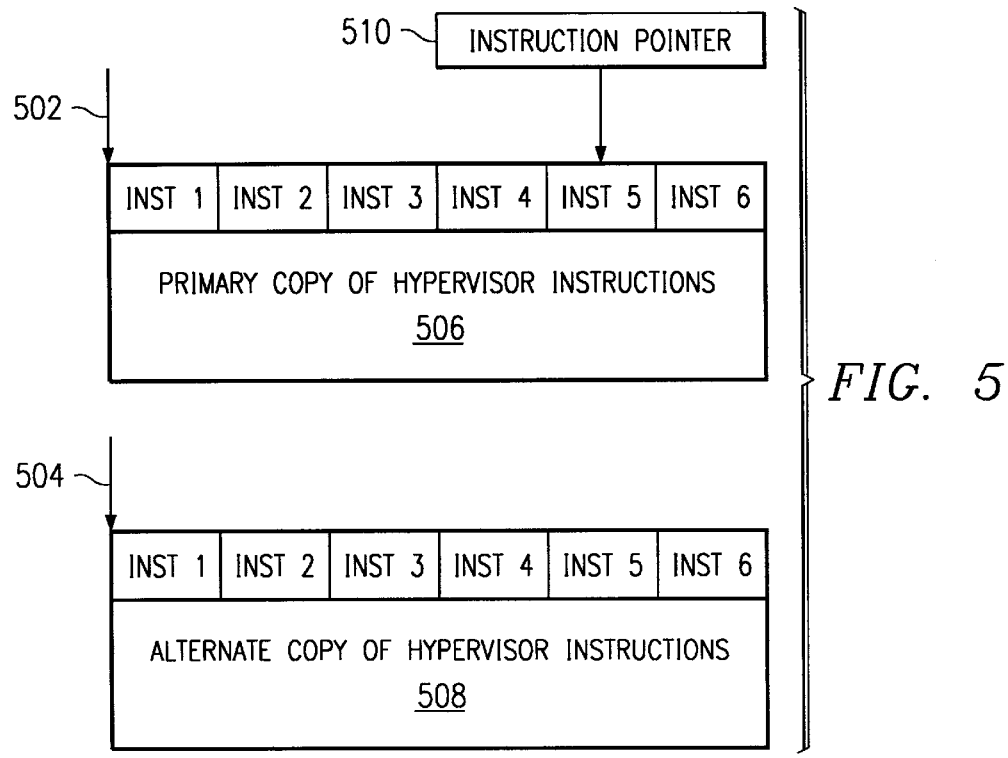
FIG. 5 depicts a block diagram illustrating a primary and alternate copy of hypervisor instructions in accordance with the present invention.

With reference now to FIG. 5, a block diagram illustrating a primary and alternate copy of hypervisor instructions is depicted in accordance with the present invention. In the present invention, as illustrated in FIG. 5, the error recovery routine in the hypervisor 410 maintains pointers 502, 504 to each of the copies of the hypervisor instructions 506, 508. In the depicted example, the instruction pointer 510 of one of the processors 423–438 points to the primary copy of Inst 5. Inst 1–6 are equivalent instructions in both copies 502, 504. As the processor executing the hypervisor instructions executes the next instruction, the instruction pointer 510 is adjusted to point to the next instruction in the primary copy of the hypervisor instructions 506. Each copy of the hypervisor instructions 506, 508 should be stored in a platform specific location that minimizes the probability of the corruption of the alternate copy 508 of the hypervisor instructions by an error that may cause corruption of the primary copy 506 of the hypervisor instructions.

When the instruction fetch error is determined to be hard (i.e. that the error is not due to transient electrical noise which is recovered using retry common in the art), the machine check code points the processors interrupt vectors, that point to the primary copy 506 of the hypervisor instructions, to the alternate copy 508 of the hypervisor instructions. The machine check code than computes the new location for the instruction restart within the alternate copy based on pointer 504. The processor then continues with the instruction from the new location within alternate copy 508. Thus, the instruction fetch error has been recovered from and the instruction fetch error has had a minimal or no effect on the OS images running within the platform. When and if all processors within the platform are using the alternate copy 508, the primary copy 506 of the hypervisor instructions may be refreshed from the alternate copy 508 as a background operation. By duplicating this relatively small amount of hypervisor code, the amount of memory used is insignificant and the performance and simplicity of the memory system is maintained.

Figure 6:
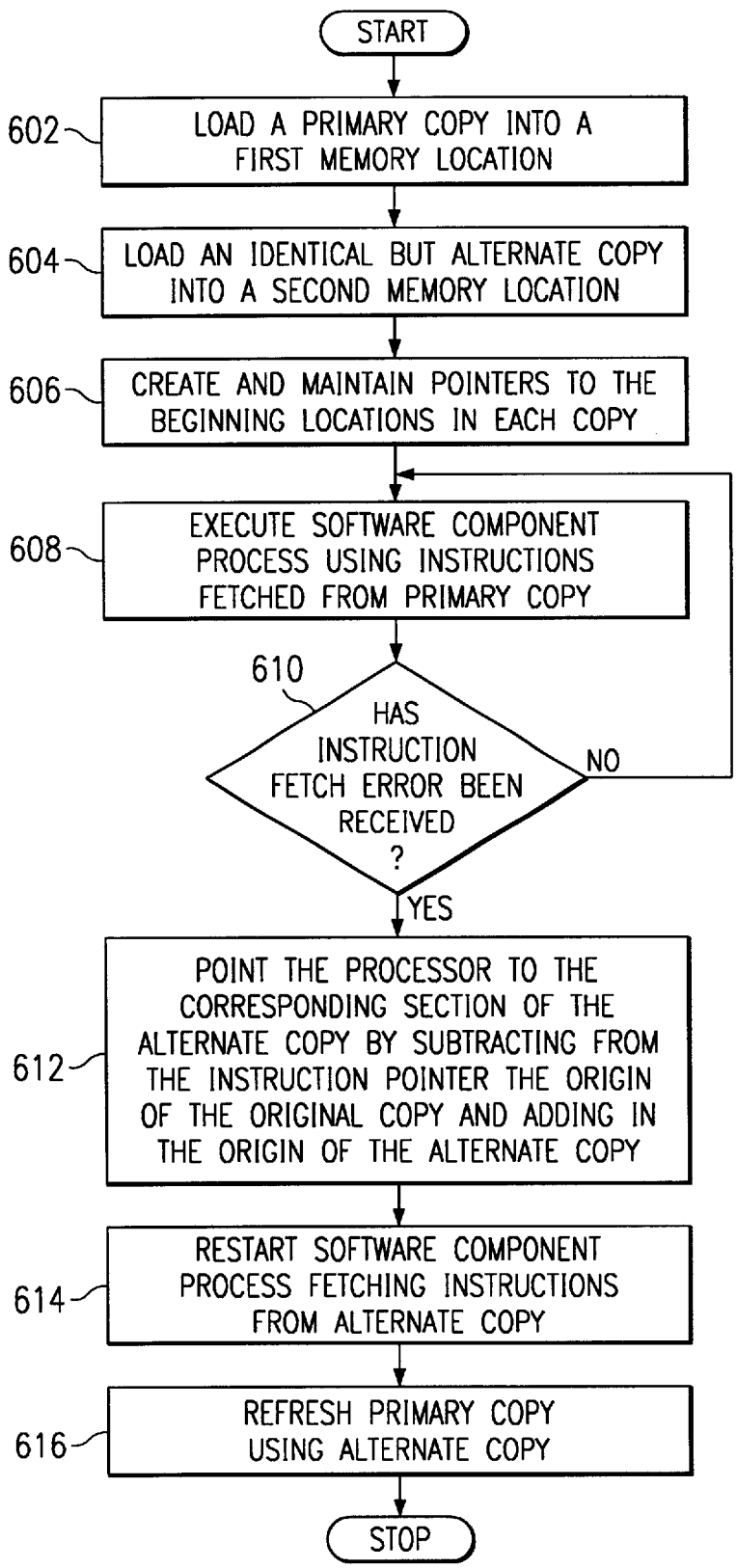
FIG. 6 depicts a flowchart illustrating an exemplary method of recovering from instruction fetch errors is depicted in accordance with the present invention.

With reference now to FIG. 6, a flowchart illustrating an exemplary method of recovering from instruction fetch errors, is depicted in accordance with the present invention.

To begin, the machine check code within a data processing system, such as, for example, data processing system 300, loads a primary copy instructions of a software component into a first memory location (step 602). This software component may be, for example, hypervisor 410 in FIG. 4. The machine check code then loads an identical but alternate copy of the instructions for the software component into a second memory location (step 604). The machine check code creates and maintains pointers to the origins of the corresponding sections of each copy of the instructions (step 606). These pointers identify the equivalent instruction in the opposite copy of the instructions. The processor then executes the software component process using instructions fetched from the primary copy of the instructions (step 608).

The machine check code then determines whether an instruction fetch error has been received from the processor executing the software component's instructions (step 610). If no instruction fetch error has been received, then the processor continues executing the software component's instructions as fetched from the primary copy of the instructions (step 610). If an instruction fetch error has been received, then the machine check code points the processor to the corresponding section of the alternate copy (step 612) and the processor restarts the software component's process by fetching instructions from the alternate copy beginning with the instruction in the location to which the pointer is pointing (step 614). The machine check code then refreshes the primary copy of the instructions using the alternate copy of the instructions (step 616). If there are more than one processor executing instructions for the software component, then the machine code waits until all processors have switched to the alternate copy and then refreshes the primary copy.

Although the present invention has been described primarily with respect to a firmware implemented hypervisor for maintaining the integrity of partitions within a logically partitioned data processing system, the method, apparatus, and system of the present invention may be applied to any software component. It is also important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A logically partitioned data processing system, comprising:

a plurality of operating systems, each assigned to a separate one of a plurality of logical partitions;

a plurality of processors, each assigned to one of the plurality of logical partitions; and a primary copy of a set of hypervisor instructions stored in a first memory location and an alternate copy of the set of hypervisor instructions stored in a second memory location, wherein the data processing system maintains a pointer to the beginning or each copy of the hypervisor instructions and an instruction pointer to a current instruction in the primary copy;

the data processing system executes the primary copy of the hypervisor instructions; and responsive to receipt of an irrecoverable instruction fetch error for a selected instruction from the primary copy, the data processing system restarts execution of the hypervisor instructions front another instruction in the alternate copy in which the another instruction corresponds to the selected instruction.

2. The logically partitioned data processing system as recited in claim 1, wherein, responsive to a determination that all of the plurality of processors are utilizing the alternate copy, refreshing the primary copy from the alternate copy.

3. The logically partitioned data processing system as recited in claim 2, wherein the refreshing the primary copy occurs as a background operation.

4. The logically partitioned data processing system as recited in claim 1, wherein the hypervisor is implemented as firmware.

5. A method in a data processing system for recovering from an instruction fetch error, the method comprising:

maintaining a primary copy and an alternate copy of a set of instructions for a software comprising;

fetching instructions from the primary copy for execution by a processor;

maintaining a primary pointer and a secondary pointer, each pointer identifying a beginning of a respective copy;

maintaining an instruction pointer to a current instruction within the primary copy; and responsive to a determination that an instruction fetch error has been received, determining a corresponding current instruction in the alternate copy corresponding to the current instruction and restarting the software component by fetching and executing instructions from the alternate copy starting with the corresponding current instruction;

wherein the data processing system is a logically partitioned data processing system and the software component is a hypervisor component for creating and enforcing logical partitions within the logically partitioned data processing system.

6. The method as recited iii claim 5, further comprising:

refreshing the primary copy of the set of instructions using the alternate copy of the set of instructions.

7. The method as recited in claim 6, wherein refreshing the primary copy occurs a background operation.

8. The method as recited in claim 5, wherein the hypervisor component is implemented in firmware.

9. The method as recited in claim 5, wherein the data processing system comprise a plurality of processors and further comprising:

responsive to a determination that all processors are executing the software component's instructions using the alternate copy, refreshing the primary copy using the alternate copy.

10. The method as recited in claim 9, wherein refreshing the primary copy occurs in a background operation.

11. The method as recited in claim 5, wherein the corresponding current instruction is determined by subtracting a beginning address of the primary copy, as determined from the primary pointer, with an address of the current instruction in which the fetch error occurred as determined by the instruction pointer, then adding the beginning address of the alternate copy.

12. A computer program product in computer readable media for use in a data processing system for recovering from an instruction fetch error, the computer program product comprising:

first instructions for maintaining a primary copy and an alternate copy of a set of instructions for a software component;

second instructions for fetching instructions frown the primary copy for execution by a processor;

third instructions for maintaining a primary pointer and a secondary pointer, each pointer identifying a beginning of a respective copy;

fourth instructions for maintaining an instruction pointer to a current instruction within the primary copy;

fifth instructions, responsive to a determination that an instruction fetch error has been received, for determining a corresponding current instruction in the alternate copy corresponding to the current instruction and restarting the software component by corresponding and executing instructions from the alternate copy starting with the corresponding current instruction; and wherein the data processing system is a logically partitioned data processing system and the software component within the logically partitioned data processing system.

13. The computer program product as recited in claim 12, further comprising:

sixth instructions for refreshing the primary copy of the set of instructions using the alternate copy of the set of instructions.

14. The computer program product as recited in claim 13, wherein refreshing the primary copy occurs in a background operation.

15. The computer program product as recited in claim 13, wherein the hypervisor component is implemented in firmware.

16. The computer program product as recited in claim 12, wherein the data processing system comprises a plurality of processors and further comprising:

sixth instructions, responsive to a determination that all processors are executing the software components instructions using the alternate copy, for refreshing the primary copy using the alternate copy.

17. The computer program product as recited in claim 16, wherein refreshing the primary copy occurs in a background operation.

18. The computer program product as recited in claim 12, wherein the corresponding current instruction is determined by subtracting a beginning address of the primary copy, as determined from the primary pointer, within an address of the current instruction in which the fetch error occurred as determined by the instruction pointer, then adding the beginning address of the alternate copy.

19. A system for recovering from an instruction fetch error, the system comprising:

first means for maintaining a primary copy and an alternate copy of a set of means for a software component;

second means for fetching means from the primary copy for execution by a processor;

third means for maintaining a primary pointer and a secondary pointer, each pointer identifying a beginning of a respective copy;

fourth means for maintaining instruction pointer to a current instruction within the primary copy; and fifth means, responsive to a determination that an instruction fetch error has been received, for determining a corresponding current instruction in the alternate copy corresponding to the current instruction and restarting the software component by fetching and executing means from the alternate copy starting with the corresponding current instruction; and wherein the data processing system is a logically partitioned data processing system and the software components is a hypervisor component for creating and enforcing logical partitions within the logically partitioned data processing system.

20. The system as recited in claim 19, further comprising:

sixth means for refreshing the primary copy of the set of means using the alternate copy of the set of means.

21. The system as recited in claim 20, wherein refreshing the primary copy occurs in a background operation.

22. The system as recited in claim 19, wherein the hypervisor component is implemented in firmware.

23. The system as recited in claim 19, wherein the data processing system comprises a plurality of processors and further comprising:

sixth means, responsive to a determination that all processors are executing the software component's means using the alternate copy, for refreshing the primary copy using the alternate copy.

24. The system as recited in claim 23, wherein refreshing the primary copy occurs in a background operation.

25. The system as recited in claim 19, wherein corresponding current instruction is determined by subtracting a beginning address of the primary copy, as determination from the primary pointer, with an address of the current institution in which the fetch error occurred as determined by the instruction pointer, then adding the beginning address of the alternate copy.

\* \* \* \* \*